US005738135A

United States Patent [19]

Johnson

[11] Patent Number: 5,738,135

[45] Date of Patent: Apr. 14, 1998

[54] DISPENSING APPARATUS WITH LINE PRESSURE DIVERTER

[75] Inventor: Robert E. Johnson, St. Paul, Minn.

[73] Assignee: Ecolab Inc., St. Paul, Minn.

[21] Appl. No.: 493,259

[22] Filed: Jun. 21, 1995

Related U.S. Application Data

[63] Continuation-in-part of Ser. No. 358,778, Dec. 19, 1994.

[51] Int. Cl.[6] .................. F16K 11/052

[52] U.S. Cl. .................. 137/119.06; 137/119.09; 137/597; 137/895

[58] Field of Search .................. 137/597, 895, 137/115.15, 118.05, 119.06, 119.09

[56] References Cited

U.S. PATENT DOCUMENTS

| | | | |
|---|---|---|---|
| Re. 32,818 | 1/1989 | Fernholz et al. | 252/90 |
| 2,886,214 | 5/1959 | Sturman | 137/895 X |
| 2,894,695 | 7/1959 | Bletcher et al. | 137/562 X |
| 2,895,676 | 7/1959 | Kraft | 137/597 |
| 3,491,948 | 1/1970 | Alexander | 137/895 |
| 3,575,348 | 4/1971 | MacKay | 137/895 |
| 3,995,664 | 12/1976 | Nelson | 138/43 |
| 4,020,865 | 5/1977 | Moffat et al. | 137/268 |
| 4,119,276 | 10/1978 | Nelson | 239/590.3 |
| 4,133,350 | 1/1979 | Nelson | 138/44 |
| 4,182,354 | 1/1980 | Bergstedt | 137/115.15 |
| 4,278,132 | 7/1981 | Hostetter | 169/13 |
| 4,314,673 | 2/1982 | Rudelick | 137/597 X |
| 4,315,600 | 2/1982 | Rhoades et al. | 239/74 |
| 4,344,459 | 8/1982 | Nelson | 138/45 |
| 4,584,106 | 4/1986 | Held | 210/754 |
| 4,650,470 | 3/1987 | Epstein | 604/149 |
| 4,730,786 | 3/1988 | Nelson | 239/590.3 |
| 4,881,568 | 11/1989 | Ho | 137/268 |
| 5,016,817 | 5/1991 | Ghate et al. | 239/113 |
| 5,033,649 | 7/1991 | Copeland et al. | 222/132 |
| 5,053,206 | 10/1991 | Maglio et al. | 422/264 |
| 5,268,153 | 12/1993 | Muller | 422/263 |
| 5,332,312 | 7/1994 | Evanson | 366/136 |
| 5,335,690 | 8/1994 | Worth | 137/268 |
| 5,344,074 | 9/1994 | Spriggs et al. | 239/10 |
| 5,350,512 | 9/1994 | Tang | 210/199 |

OTHER PUBLICATIONS

Male to Female Flow Control and Needle Valves product literature.

Engineered Controls International, Inc. product literature.

Fluid Control Methods product literature (1990).

Swagelok product literature (1987).

Computer Database Search of Modern Faucet Patents.

NLF9 product data sheet, Watts Industries.

*Primary Examiner*—Stephen M. Hepperle

*Attorney, Agent, or Firm*—Merchant, Gould, Smith, Edell, Welter & Schmidt P. A.

[57] ABSTRACT

A dispensing apparatus for dispensing a chemical product mixed with water is connected to a water supply through a line pressure diverter which relieves pressure in downstream of the water supply when the dispensing apparatus is not activated. Pressure is diverted by diverting the flow of water from a water supply to a second outlet port on the diverter. The line pressure diverter permits a dispensing apparatus to be installed on conventional water supply faucets without substantial modification thereto, and without causing damage to any pre-existing backflow prevention devices installed on the water supply.

21 Claims, 7 Drawing Sheets

DISPENSING APPARATUS WITH LINE PRESSURE DIVERTER

This application is a continuation-in-part of U.S. Ser. No. 08/358,778 filed by Robert E. Johnson on Dec. 19, 1994 pending.

FIELD OF THE INVENTION

The invention is directed to a dispensing apparatus for dispensing a chemical product. More particularly, the invention is directed to a dispensing apparatus of the type having a diluent inlet for receiving a diluent from a diluent supply to mix the diluent with a chemical product.

BACKGROUND OF THE INVENTION

Dispensing systems which dispense one or more chemical products diluted with a diluent such as water are generally known in the art. Chemical products may be provided in solid block form, powder form, liquid concentrate, gel, or other compositions known in the art. Conventional dispensing systems dilute the chemical products with water to form a solution having a controlled concentration of chemical product therein. Other dispensing systems may be non-homogeneous, whereby chemical products are dispersed or suspended in a liquid.

Dispensing systems which are portable have become increasingly popular, particularly in the cleaning area, to enable maintenance personnel for a facility to generate cleaning solutions close to a point of use. Portable dispensing systems typically require a source or supply of diluent, e.g., a standard water faucet on a utility sink. Portable dispensing systems typically dispense into a mop bucket, sink, or they may alternatively dispense into separate containers within the dispensing system, e.g., for filling individual spray bottles with cleaning solution.

However, many portable dispensing systems do not directly comply with various plumbing codes established throughout the U.S. and abroad. For example, many plumbing codes require some sort of backflow prevention device, such as an air gap or check valve, to prevent the contamination or pollution of a water supply due to contaminants backing up into the water supply. Another potential concern is due to possible cross contamination of hot and cold water supplies, where water from one supply may flow into the other if the supplies are connected and one of the supplies is at a greater pressure than the other. Also, faucets are often installed above a sink or basin to provide an air gap and thereby prevent the faucet from ever being submerged.

To comply with plumbing codes, many facilities include atmospheric vacuum breakers and the like for providing backflow prevention. Many of these devices, e.g., atmospheric vacuum breakers, are not designed to be left under line pressure. Many portable dispensing systems, however, present a problem when attached to conventional water supplies because they may cause the existing backflow prevention devices installed with the water supply to be subjected to continuous line pressure.

For example, many chemical product dispensers are attached to a faucet through a hose and optionally a quick connect fitting, and have a downstream control valve for controlling the dispenser by regulating the flow of water into the dispenser. Consequently, when a dispensing system is attached to a faucet and the faucet is turned on, but the dispenser is not actuated, the line pressure which builds up in the inlet line of the dispenser may cause damage to the atmospheric vacuum breaker.

Accordingly, many manufacturers of dispensing systems recommend that the master control for a dispenser be the control valve (typically the faucet) of the water supply, and further that the dispensing system be disconnected from the water supply when not in use. Many maintenance personnel, on the other hand, often disregard these instructions and leave the dispensing system attached to a water supply with the water supply faucet open, instead using the dispenser control valve to dispense chemical product solution when needed.

To anticipate this potential use by maintenance personnel, many plumbing codes require a facility to hard plumb a separate backflow prevention device (which is designed to be subjected to continuous line pressure) onto each existing faucet installation where a portable dispenser will be used. Each installation requires a building permit and is relatively costly to install, maintain, and inspect on a yearly basis. This problem is magnified when a facility wishes to use dispensers at multiple faucets throughout the facility.

Therefore, a need exists for a dispensing system which may be connected to existing plumbing without substantial modification to the existing system, without damaging any backflow prevention devices attached thereto, and without conflicting with any established plumbing codes.

SUMMARY OF THE INVENTION

The invention addresses these and other problems associated with the prior art by providing a dispensing apparatus having a line pressure diverter for relieving pressure downstream of a diluent supply when the control valve of the apparatus is not activated. The line pressure diverter provides a sufficient flow of diluent when the control valve is activated, yet the pressure within the diluent line is not allowed to build up to a point which will damage any existing backflow prevention device in the diluent supply when the control valve is not activated. Furthermore, the line pressure diverter requires little or no modification to existing plumbing systems for a diluent supply, thereby complying with many plumbing codes in a cost effective manner.

Therefore, in accordance with one aspect of the invention, there is provided a dispensing apparatus which includes a chemical product dispenser for dispensing a chemical product mixed with a diluent, the chemical product dispenser including a diluent inlet line for receiving a flow of diluent from a diluent supply, and a control valve for controlling the flow of diluent to the dispenser; and a line pressure diverter, interposed between the diluent inlet line of the chemical product dispenser and the diluent supply, for diverting line pressure from the diluent supply when the control valve of the chemical product dispenser is closed.

In accordance with another aspect of the invention, there is provided a line pressure diverter for use in a dispensing apparatus of the type including a chemical product dispenser for dispensing a chemical product mixed with a diluent, the chemical product dispenser including a diluent inlet line for receiving a flow of diluent from a diluent supply having a backflow prevention device installed thereon, and a control valve for controlling the flow of diluent to the dispenser. The line pressure diverter includes an inlet channel in fluid communication with the diluent supply, the inlet channel being connected to the diluent supply through a quick connect fitting; a first outlet channel, in fluid communication with the inlet and the diluent inlet line of the chemical product dispenser; and a second outlet channel, in fluid communication with the inlet channel through a pressure relief means for diverting diluent to the second outlet when pressure downstream of the diluent supply exceeds a predetermined level; whereby the pressure downstream of the diluent supply is maintained at a level below that which would cause damage to the backflow prevention device installed on the diluent supply.

In accordance with a further aspect of the invention, there is provided a method of communicating diluent from a diluent supply to a diluent inlet line of a chemical product dispenser for dispensing a chemical product in solution, wherein the diluent supply is of the type having an atmospheric vacuum breaker and wherein the chemical product dispenser is of the type having a control valve for controlling the flow of diluent to the dispenser. The method includes the steps of, when the control valve of the chemical product dispenser is open, directing diluent between the diluent supply and the diluent inlet line of the chemical product dispenser using a line pressure diverter having an inlet connected in fluid communication to the diluent supply and a first outlet connected in fluid communication to the diluent inlet line; and, when the control valve of the chemical product dispenser is closed, diverting diluent out of a second outlet of the line pressure diverter to maintain pressure downstream of the diluent supply at a level below that which would cause damage to the atmospheric vacuum breaker installed on the diluent supply.

These and other advantages and features, which characterize the invention, are set forth in the claims annexed hereto and forming a further part hereof. However, for a better understanding of the invention, and the advantages and objectives obtained by its use, reference should be made to the Drawing, and to the following descriptive matter, in which various preferred embodiments of the invention are described.

DETAILED DESCRIPTION OF THE PREFERRED EMBODIMENTS

Figure 1:
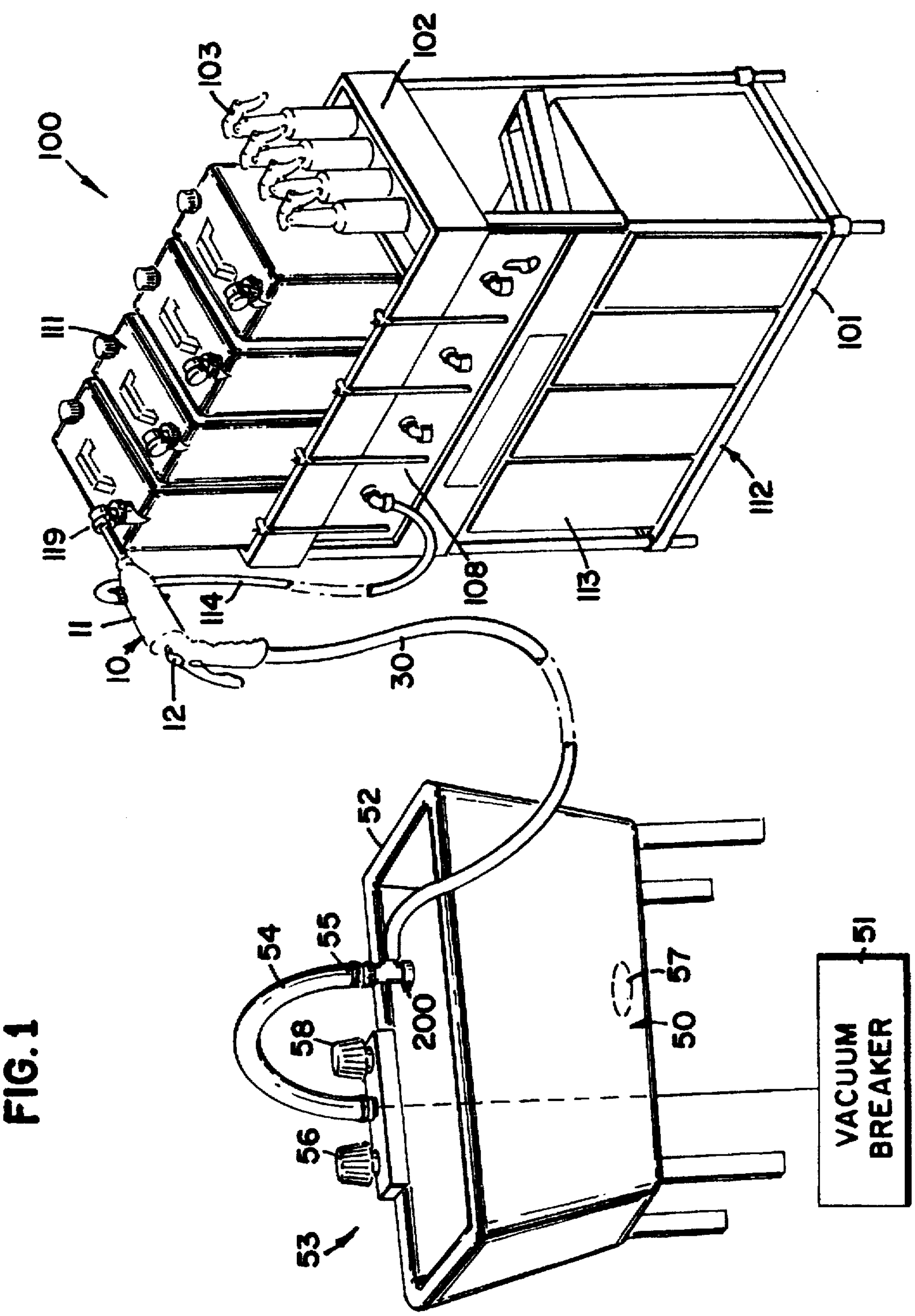
FIG. 1 is a preferred dispensing apparatus consistent with the principles of the invention.

Turning to the Drawing, wherein like parts are denoted by like numbers throughout the several views, FIG. 1 shows a dispensing apparatus 100 consistent with the principles of the invention. Many of the components in this type of dispensing apparatus are generally disclosed in U.S. Pat. No. 5,344,074 to Spriggs et al., which is incorporated herein by reference.

Dispensing apparatus 100 includes a rack 112 having a lower shelf 101 and a top shelf 102. Lower shelf 101 supports a plurality of concentrate containers 113, each of which contains a liquid concentrate of chemical product. A product discharge tube 114 extends from each concentrate container 113 and passes through front panel 108.

Top shelf 102 supports a plurality of jugs, or use containers 111, each having an inlet 119. Each use container stores a use solution (chemical product diluted with water), and each has a spigot which may be used to fill other containers such as spray bottles 103.

Dispensing apparatus 100 includes a spray gun 10 that forms a chemical product dispenser for dispensing a chemical product mixed with a quantity of diluent. The preferred diluent for use with dispensing apparatus 100 is water, and accordingly, the remainder of the disclosure will discuss the diluent as being water. However, it will be appreciated that other diluents may be used to form a solution, and consequently, the invention should not be limited as such.

Spray gun 10 includes a water (diluent) inlet line 30 which is connected to a handle-activated control valve 12. An aspirator 11 is provided in the spray gun to mix a preset concentration of liquid concentrate in a flow of water when the control valve is actuated, or opened. Accordingly, to dispense a particular chemical product from one of the concentrate containers 113, the appropriate product discharge tube 114 is connected to the spray gun, then the gun may be used to dispense diluted chemical product to use solution containers 111 through the inlets 119 thereon, or alternatively directly to a mop bucket or other point of use container, by opening control valve 12.

Spray gun 10 may also include a backflow prevention device. However, it has been found that the backflow prevention devices provided with many dispensers do not fully comply with many plumbing codes, and may nonetheless require a separate backflow prevention device to be installed at the water supply. Often, these types of backflow prevention devices are mounted downstream of control valve 12, such that they are not subjected to continuous line pressure. An example of a backflow prevention device suitable for use on spray gun 10 is the Watts No. N-LF9 backflow preventer, which complies with the ASSE 1035 standard for laboratory faucet vacuum breakers, although others are known in the art.

Different chemical product dispensers may be used consistent with the invention, for example, other liquid concentrate dispensers such as described in U.S. Pat. No. 5,033,649, issued to Copeland et al., or others known in the art. Moreover, chemical product dispensers which use solid block or powder chemical concentrates may be used, as may any other type of chemical product dispenser which mixes, dissolves, suspends or disperses one or more chemical products in one or more diluents.

Water inlet line 30 of spray gun or dispenser 10 is connected to a water supply 50 through a line pressure diverter 200. Water supply 50 preferably includes a utility sink 52 which may also be a tub, basin, or other reservoir, and which includes a drain 57. Moreover, the utility sink may be wall mounted, self-standing, built-in, floor mounted, etc. Also, water supply 50 may not include a separate sink, for example outdoors, or where a floor drain is instead provided.

A faucet 53 includes a spigot 54 having an outlet 55 (which may be threaded or not threaded) for dispensing water therefrom. Separate hot and cold water control valves 56 and 58 control the flow of hot and cold water through spigot 54. Alternatively, faucet 53 may be only connected to a hot or a cold line, or may include a single valve with a temperature control for metering the flow of hot and cold water. Consistent with many plumbing codes, water supply 50 typically includes an atmospheric vacuum breaker 51 installed upstream of the faucet to provide backflow prevention. However, it will be appreciated that supply 50 is merely representative of a typical installation, and that many variations are possible.

Preferred line pressure diverters function to divert line pressure when the dispenser control valve is not activated (closed) and faucet 53 is on, while providing a sufficient flow of water to the dispenser when the control valve of the dispenser is activated (open). Generally, preferred line pressure diverters include an inlet and first and second outlets. The inlet includes an inlet channel and receives water from the pressurized water supply. The first outlet includes a first outlet channel and communicates water to the dispenser when the control valve on the dispenser is open. The second outlet includes a second outlet channel and a pressure relief mechanism for diverting water to the second outlet when the pressure downstream of the water supply exceeds a predetermined level which is preferably below that which would cause damage to any existing backflow prevention devices installed at the water supply.

Preferred line pressure diverters generally may include any structure that operates to provide either a single normally closed pressure activated valve on the second outlet port, or a pair of normally closed pressure activated valves on the outlet ports, with the valve on the second port being opened at a higher pressure. Any such structure preferably permits flow to take the path of least resistance, whereby when the dispenser control valve is activated, the least resistance will be provided to the first outlet port to provide a flow of water to the dispenser. However, when the dispenser control valve is not activated, the path of least resistance is selected to be the second outlet to divert line pressure by allowing water to flow through the second outlet port.

For many water supplies which include a standard atmospheric vacuum breaker, the atmospheric vacuum breaker should not be subjected to continuous line pressure. Consequently, it is preferred to divert sufficient flow to the second outlet such that the atmospheric vacuum breaker is not under line pressure.

Several benefits are provided by these types of structures. First, preferred line pressure diverters prevent existing backflow prevention devices installed in a water supply from being damaged, and consequently prevent the pollution or cross-contamination of the water supply. The continuous flow prevents the contamination of the cold water by hot water which could occur if no flow was present and the water supply valves were left open. This enables many dispensers to be used with existing water supplies directly, without the installation of supplemental backflow prevention devices, and still comply with most plumbing codes. The preferred line pressure diverters consequently may be used throughout a facility with little or no modification to existing plumbing systems, thereby offering substantial cost savings. Another benefit of the preferred line pressure diverters is that they provide a natural air gap from the second outlet to any drain, particularly in embodiments which may be constructed to fit onto the end of a faucet.

Moreover, preferred line pressure diverters operate as reminders for maintenance personnel to turn off the faucet(s) when the dispenser is no longer being used, since the diversion of line pressure will induce flow through the second outlet port. This therefore enables the dispenser to be used as it was designed, i.e., where the dispenser is only connected to a water supply when it is being used. This may further reduce the likelihood of dispenser lines leaking, breaking or flooding a facility when they are left unattended.

It will be appreciated that many different devices may be constructed to perform these tasks consistent with the invention. Several exemplary embodiments are shown in FIGS. 2–8.

Figure 2:
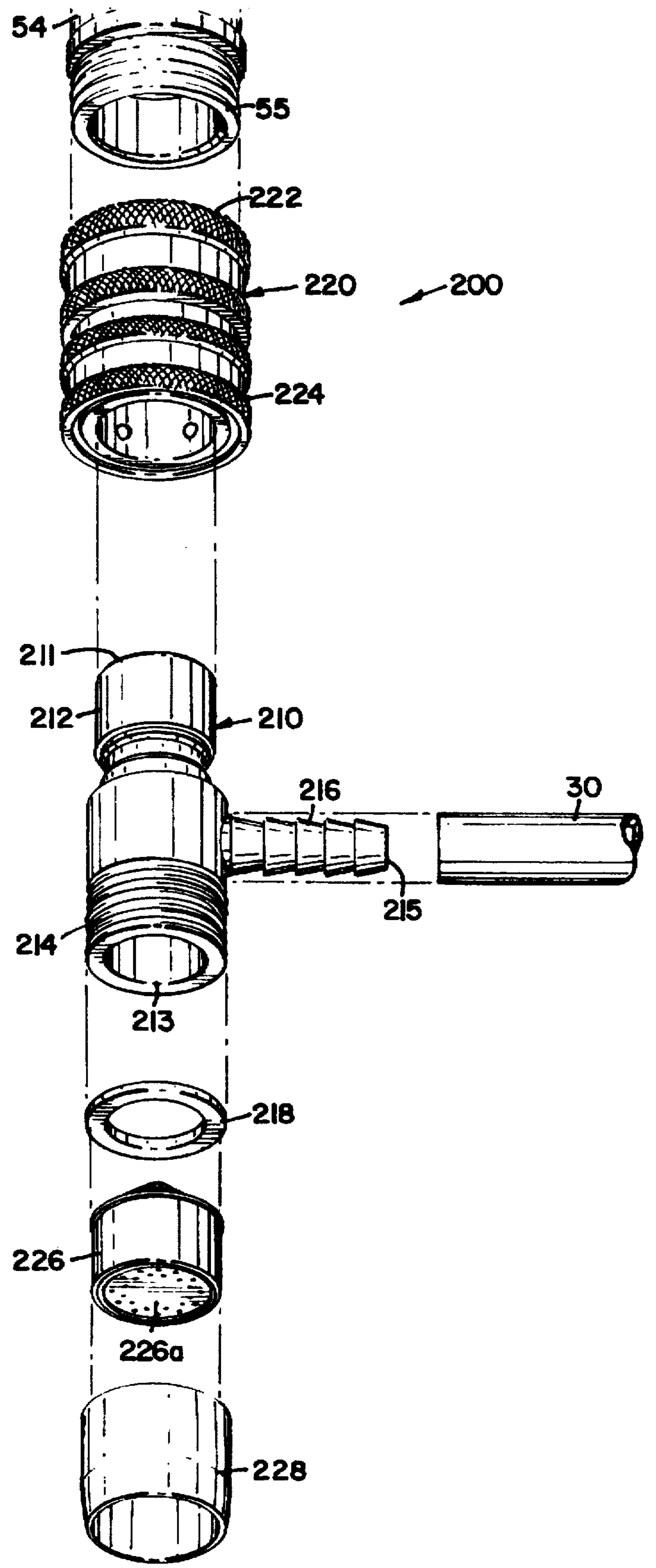
FIG. 2 is an exploded perspective view of the line pressure diverter from the apparatus of FIG. 1.

FIG. 2 shows a preferred line pressure diverter 200. Diverter 200 includes a T-fitting 210 which provides an inlet 211, a first outlet 215, and a second outlet 213. Inlet 211 is preferably provided with a first (male) quick connect fitting 212. A second (female) quick connect fitting 220 is used to connect the inlet of the T-fitting to spigot 54 of the water supply.

Female fitting 220 preferably includes a threaded connector 222 which may be threaded onto outlet 55 of spigot 54. At the opposing end of fitting 220, a sleeve 224 is included which may be actuated by an operator to remove or insert male fitting 212 from female fitting 220. This type of quick connect fitting is a coupling type fitting such as available from Parker Fluid Connectors. However, it will be appreciated that other quick connect fittings are also known in the art, e.g., a stationary male fitting may be provided on the faucet with a cooperative female fitting provided on the diverter.

The use of a quick connect fitting has the advantage in that one part of the quick connect fitting may be installed more permanently to a faucet, and the dispensing apparatus may be connected to the faucet more quickly and easily than if, for example, the line pressure diverter had a threaded connection for screwing directly onto the faucet. The design of many quick connect fittings also enables the faucet to be used in a normal manner when the dispensing apparatus is not installed thereon. This enables multiple female fittings to be mounted to different faucets throughout a facility, so that a dispensing apparatus may be connected to any of the faucets very quickly using the same line pressure diverter.

It will be appreciated, however, that other fittings or connections may be used to connect inlet 211 to spigot 54. For example, a threaded fitting may be provided at inlet 211 to thread directly onto spigot 54.

T-fitting 210 also includes a first outlet 215 which connects to the water inlet line 30. Preferably, first outlet 215 includes a barbed type connector 216 which enables water inlet line 30 to be securely installed, yet enable the line to be removed and replaced if desired. Alternatively, any other known fitting may be used to connect the water line to the line pressure diverter.

Second outlet 213 of fitting 210 is provided with a flow restricter 226 (having orifices 226*a*) which limits flow through the outlet. Flow restricter 226 is preferably housed within cap 228 which is then threaded onto threads 214 on T-fitting 210 with an o-ring seal 218 disposed therein.

Diverter 200 operates as follows. When the dispenser control valve is not activated, and the faucet is open, pressure will be relieved by diverter 200 by allowing the flow of water through second outlet port 213, thereby maintaining the pressure downstream of the water supply at a level in which the life of the existing backflow prevention system of the water supply is not compromised. Then, when the dispenser control valve is activated, water will flow to the path of least resistance, here first to outlet port 215, since some degree of back pressure will be generated by the flow restricter 226. Some flow will still occur through second outlet port 213, however, enough pressure will typically be provided to operate the dispenser despite this leakage flow.

Flow restricter 226 is preferably selected to provide enough back pressure to operate the dispenser, but not to exceed the critical pressure which would cause damage to any backflow prevention device installed on the water supply. The preferred flow restricter is a ½ (0.5) gpm Omni type flow restricter manufactured by Chronomite Laboratories, Inc. It will be appreciated, however, that the exact size of flow restricter required will vary based upon the line pressure of the water supply, the flow requirements for the dispenser, etc. For example, with typical line pressures between 20 and 120 psi, most often about 60 psi, and with typical dispenser requirements of 1 to 4 gpm, flow restriction of less than or equal to about 0.5 gpm is often acceptable.

Other manners of restricting flow, such as needle valves, metering tips, fixed orifices, flow valves, etc., may also be used in second outlet 213 to provide the necessary back pressure to adequately operate the dispenser.

Figure 3:
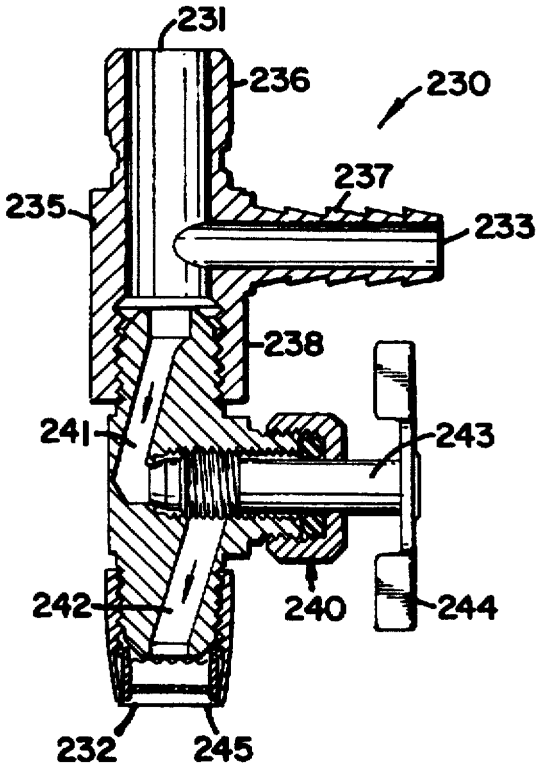
FIG. 3 is a cross-sectional view of an alternate line pressure diverter, having a variable flow restricter, and suitable for use in the apparatus of FIG. 1.

As shown in an alternate embodiment line pressure diverter 230 in FIG. 3, it may also be preferable to include a variable flow restricter, such as a needle valve 240, to vary the back pressure to optimize the operation of the diverter for different environments. Similar to diverter 200, line pressure diverter 230 includes an inlet 231, a first outlet port 233 and a second outlet port 232. Inlet 231 includes a male quick connect fitting 236 on body 235, and first outlet 233 includes a barbed fitting 237. Needle valve 240 is threaded onto flange 238 of body 235 to be interposed between inlet 231 and second outlet 232. Needle valve 240 includes a first channel 241, a second channel 242, and a needle flow restricter 243 interposed between the channels. Rotation of needle flow restricter 243 by handle 244 controls the orifice dimension between the channels, thereby varying the flow rate through the valve. An optional aerator 245, or other splash reducing device, may also be threaded onto valve 240.

Other flow restricters, including other types of variable valves, may also be used consistent with the invention. Moreover, it may be preferable to configure a variable flow restricter to limit the amount of back pressure generated (e.g., to prevent the valve from completely closing) to below the critical pressure that would damage any existing backflow prevention devices in the water supply.

Figure 4:
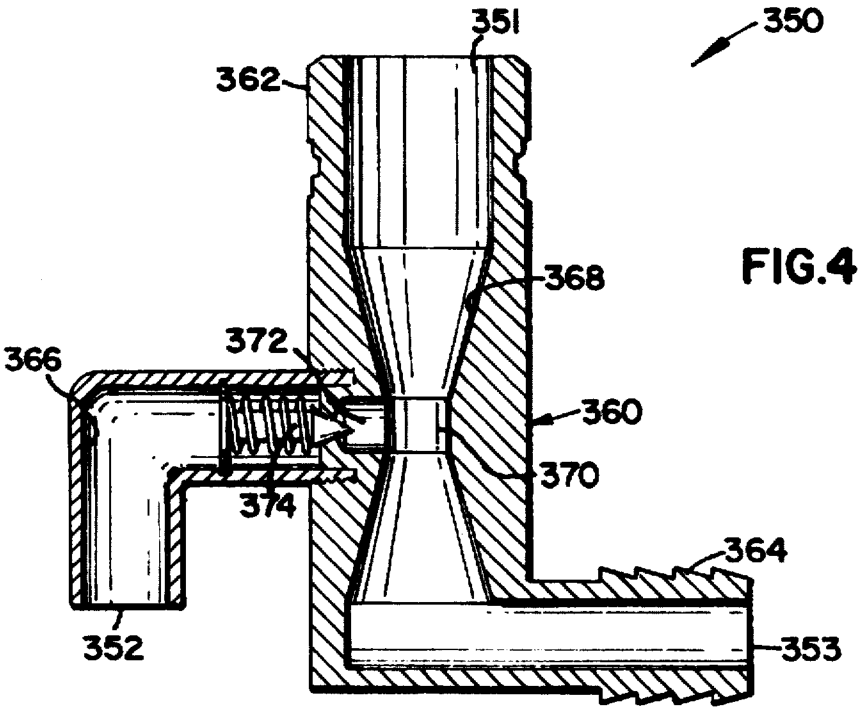
FIG. 4 is a cross-sectional view of an alternate line pressure diverter, having a flow activated relief valve, and suitable for use in the apparatus of FIG. 1.

FIG. 4 shows another alternate embodiment line pressure diverter 350 which uses a flow activated relief valve to divert line pressure to a second outlet port in lieu of a flow restricter as is used in line pressure diverter 200. Diverter 350 preferably includes a body 360 having an inlet 351 and first and second outputs 353 and 352.

Inlet 351 is preferably provided with a male quick connect fitting 362 similar to that used on diverter 200 of FIG. 2, whereby female quick connect fitting 220 may also be used in conjunction with diverter 350. Other connection fittings, such as any of those discussed above, may also be used consistent with the invention.

First outlet 353 is joined in fluid communication to inlet 351 through a venturi 368 which narrows to a throat area 370. A fitting 364, which is similar to fitting 216 on diverter 200, is used to connect diverter 350 to water inlet line 30.

Second outlet 352 is in fluid communication with inlet 351 through a channel 366, and through a channel 372 which extends generally orthogonal to throat 370. A ball check valve 374 is disposed between channels 366 and 372, and permits only one way flow in the direction from channel 372 to channel 366. Various designs for ball check valve 374 are generally known in the art, preferably being normally closed and spring loaded such that the spring pressure and the throat pressure of the venturi will be a counterforce to the backpressure of the system downstream from first outlet 353 when the system is flowing. The spring pressure will not hold against line pressure when no flow is established through the venturi. A spring pressure of about 1 to 2 psi has been found to be acceptable for many applications; however, it will be appreciated that other factors, such as the partial vacuum created in the venturi throat, will also determine the points at which check valve 374 will open and close.

Diverter 350 operates as follows. When the dispenser control valve is activated, flow will be established from inlet 351 to first outlet 353 through venturi 368. This flow will induce a partial vacuum in throat 370, which coupled with the spring bias of ball check valve 374, will shut off second outlet 352 and prohibit the flow of water out of second outlet port 352. Some leakage flow may be established out of second outlet 352; however, it is believed that the design of diverter 350 may be optimized to reduce any leakage flow through this outlet.

When the dispenser control valve is deactivated, the line pressure which builds up within diverter 350, coupled with the lack of flow through the venturi, will overcome the minimal spring bias of check valve 374 to open the valve and permit the flow of water out of second outlet 352, thereby diverting the line pressure and maintaining the life of any existing backflow prevention devices.

It will be appreciated that several modifications may be made to the preferred diverter 350. For example, different types of fittings may be used to connect to the water supply or the water inlet line. Moreover, different ball check or other types of valves, different spring forces, and different venturi designs, may also be used, e.g., to accommodate varying dispensers downstream of the diverter. Other modifications will be appreciated by one of skill in the art.

Figure 5:
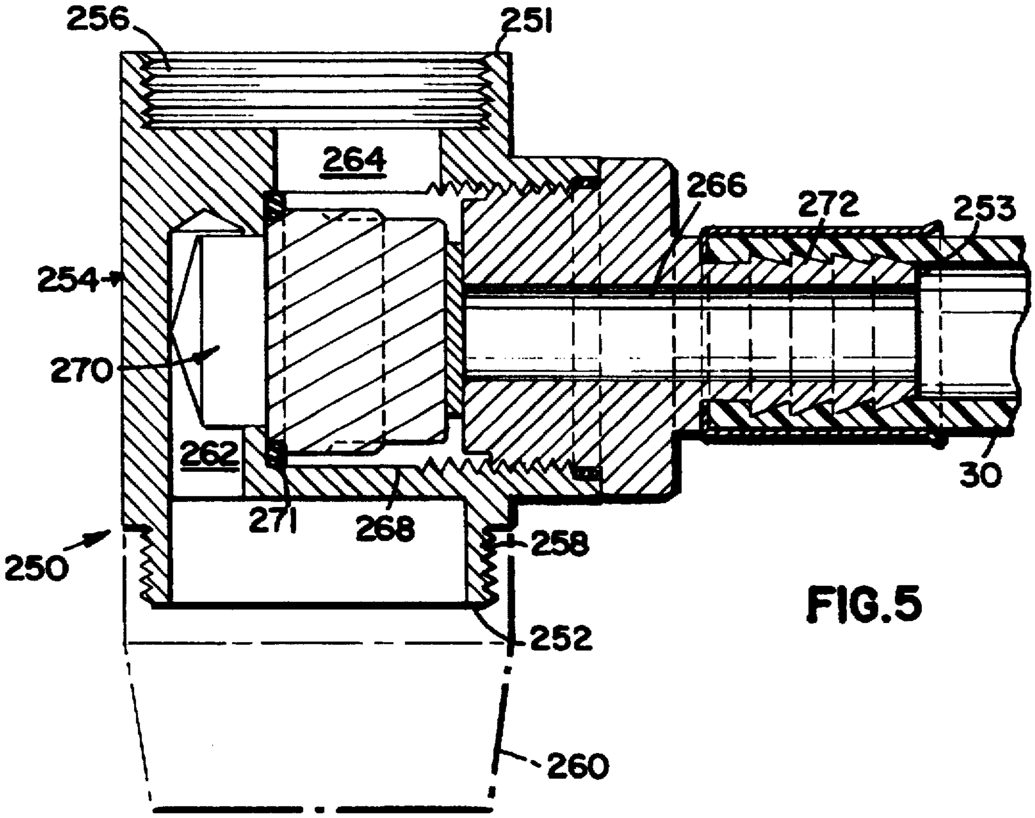
FIG. 5 is a cross-sectional view of an alternate line pressure diverter, having a diverter valve, and suitable for use in the apparatus of FIG. 1.

FIG. 5 shows an additional embodiment line pressure diverter 250, which uses a diverter valve 270 to meter flow between the first and second outlets. Diverter 250 includes a body 254 having a central chamber 268 formed therein.

An inlet 251 is connected to central chamber 268 through a channel 264. In diverter 250, a threaded fitting 256 is shown for connecting directly to a faucet. However, it will be appreciated that any other type of fitting, such as a quick connect fitting, may be used consistent with the invention.

Diverter 250 also includes a first outlet 253 which is connected to central chamber 268 through a channel 266 formed in a plug 255 that threads into body 254. Plug 255 permits external access to chamber 268 to insert or remove diverter valve 270 therefrom. A fitting 272 is used to connect diverter 250 to water inlet line 30.

A second outlet 252 is also provided on diverter 250 which is connected to central chamber 268 through a channel 262. An optional splash reducer 260 may also be threaded onto a flange 258 of body 254. Splash reducer 260 may be, for example, an Omni type aerator manufactured by Chronomite Laboratories, Inc.

A diverter valve 270 is installed in central chamber 268 with a seal 271 used to segregate chamber 268 into two separate chambers which are connected through diverter valve 270.

Diverter valve 270 is preferably the type which is typically used in many kitchen faucets to divert flow from a primary faucet to a separate spray hose. For example, one such type of diverter valve is the No. 407A valve manufactured by Modern Faucet Mfg., which typically provides a maximum flow rate of 1.4 gpm. However, it will be appreciated that different flow rates may be provided through differently sized diverter valves.

Diverter 250 operates as follows. When the dispenser control valve is activated, the flow is directed to first outlet port 253 by diverter valve 270. Some leakage, typically about 0.1 gpm with the preferred valve, may be established through second outlet port 252. When the dispenser control valve is not activated, however, flow is instead diverted to second outlet port 252 by diverter valve 270, typically at about the maximum flow rate of the faucet using the preferred diverter valve.

Various modifications may be made to this embodiment. For example, any of the above-described fittings or connections may be used on the inlet and outlet ports. Moreover, different body designs may be used, as well as different sizes of diverter valves. Also, a flow restricter may be used in second outlet port 252 to limit the diverted flow through the port.

Figure 6:
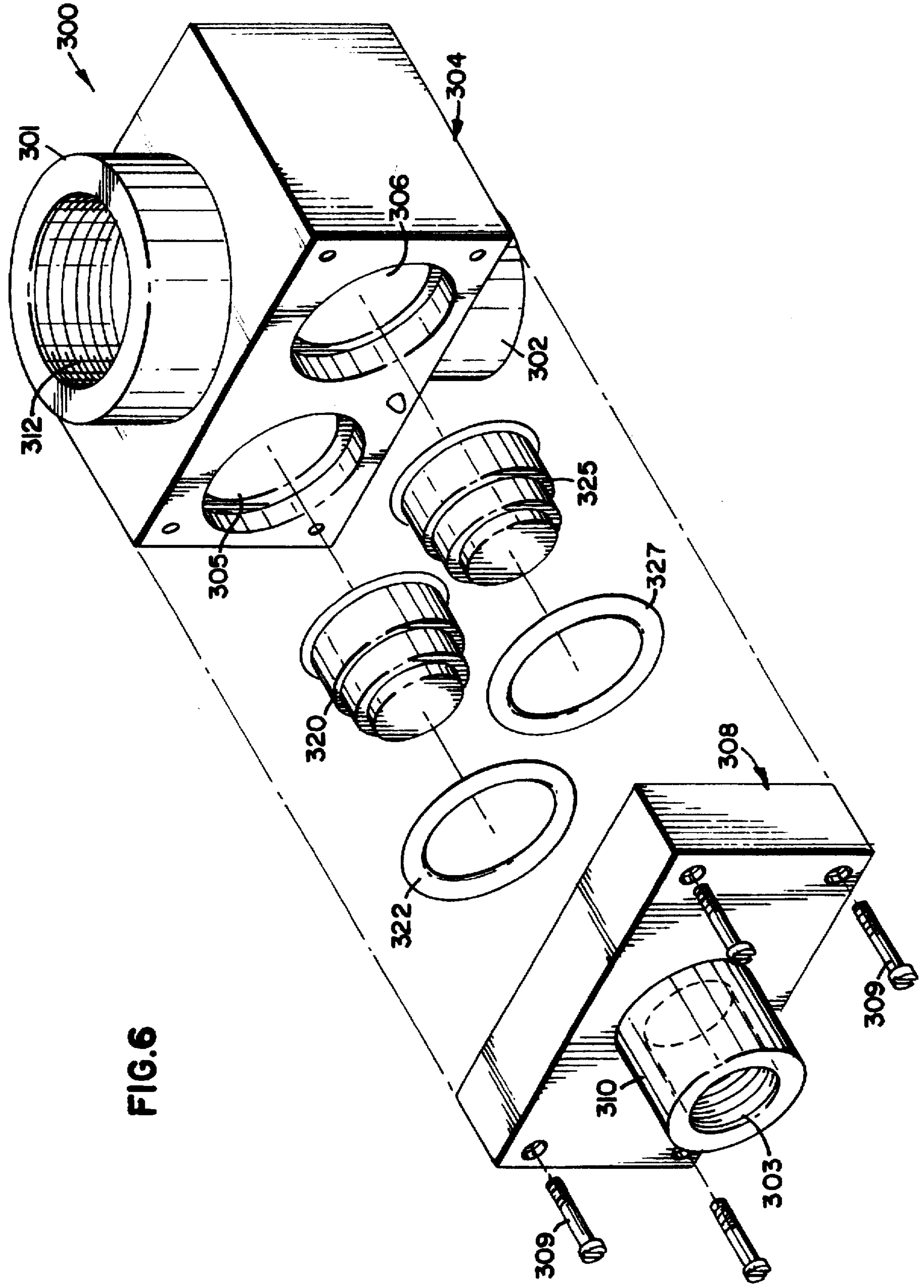
FIG. 6 is an exploded perspective view of an alternate line pressure diverter, having two diverter valves, and suitable for use in the apparatus of FIG. 1.

FIG. 6 shows another alternative embodiment 300 which uses multiple diverter valves 320 and 325 in lieu of the single diverter valve 270 used in diverter 250.

As was discussed above, the preferred diverter valve 270 is limited to about 1.4 gpm flow rate to the dispenser. In lieu of designing a larger diverter valve, it may be more cost effective to use multiple diverter valves in parallel to provide increased flow to the dispenser.

Diverter 300 includes a body 304 having an inlet 301 provided with a threaded fitting 312. A first outlet 303 is provided on a plate 308 having a threaded fitting 310. Plate 308 is mounted to body 304 by fasteners 309, and includes internal channels which connect outlet 303 to a pair of channels 305 and 306 in body 304. The second outlet 302 of diverter 300 is also a threaded connection, and may optionally include a splash reducer or aerator similar to the one used in diverter 250.

A pair of diverter valves 320 and 325 operate in parallel and are respectively received in channels 305 and 306, with suitable seals 322 and 327 installed therein. The diverter valves function in the same manner as discussed above with relation to diverter 200, but provide additional flow to first outlet port 303. To select even larger flow rates, three or more diverter valves may be used instead.

Figure 7:
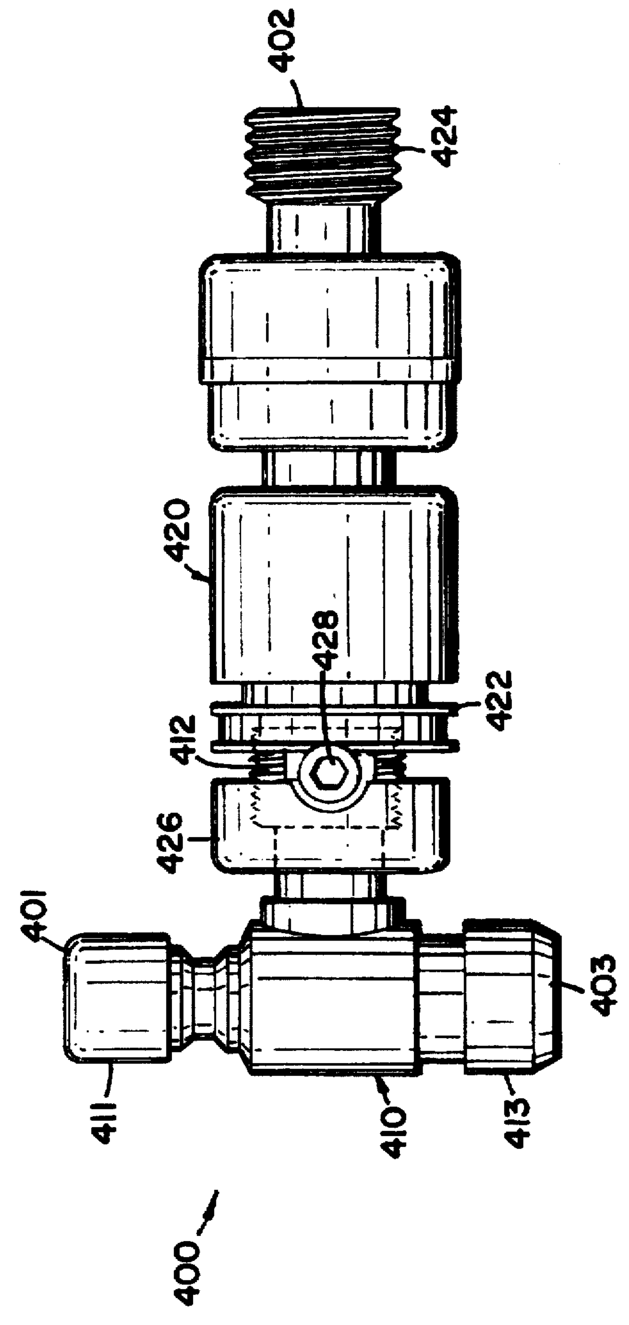
FIG. 7 is a side elevational view of an alternate line pressure diverter, having a separate backflow preventer, and suitable for use in the apparatus of FIG. 1.

FIG. 7 shows another preferred line pressure diverter 400 which utilizes a separate backflow preventer 420 to provide supplemental backflow prevention. As discussed above, some spray guns may include a backflow prevention device disposed downstream of the control valve which is not designed to withstand continuous line pressure. Moreover, it may not be desirable to position a backflow prevention device on the end of a spray gun, since the device may make the spray gun more bulky, and since it may be possible to defeat the device if the spray gun is submerged in water.

To address these concerns, a hose connection type backflow preventer, such as backflow preventer 420, may be used on diverter 400 in lieu of the separate backflow prevention device on the spray gun. By including the preventer on the diverter, interposed between the first outlet and the water inlet line, the preventer will not likely be submerged in operation, and the spray gun will be somewhat less bulky to operate.

Diverter 400 includes inlet 401, first outlet 402 and second outlet 403. Diverter 400 preferably operates in substantially the same fashion as diverter 200, with the exception of a backflow preventer 420 disposed in first outlet 402. However, any of the alternate embodiment diverting mechanisms and pressure relief mechanisms (e.g., those shown in FIGS. 3–6 and 8) may also be used with backflow preventer 420 consistent with the invention.

Diverter 400 includes a T-fitting 410 which is similar to T-fitting 210. Inlet 401 is provided with a male quick connect fitting 411, and second outlet 403 is provided with a flow restricter 413 which limits flow through the outlet similar to flow restricter 226 of FIG. 2. An 0.5 gpm Omni type flow restricter is preferably used although others may be used in the alternative.

The preferred backflow preventer 420 is a hose connection type backflow preventer. By a "hose connection" type backflow preventer, what is typically meant is a backflow preventer, typically designed for use on a faucet with a hose connected thereto, which preferably complies with the ASSE 1052 standard for hose connection backflow preventers, and which is capable of being subjected to limited backpressure without failing. The ASSE 1052 standard has been developed for faucet-mount backflow prevention devices, and while such devices are not designed to withstand continuous line pressure, the standard does require such devices to withstand limited backpressure, approximately equal to the pressure generated by a 10 foot head in the hose. One suitable device which complies with the ASSE 1052 standard is the No. 37HD backflow preventer manufactured by Woodford of Colorado Springs, Colo.

Another suitable backflow preventer which may be used is a backflow preventer which complies with the ASSE 1035 standard, such as the aforementioned Watts No. N-LF9 backflow preventer available from Watts Industries Inc. Although ASSE 1035 compatible backflow preventers are not designed for continuous pressure applications, the use of the preferred diverter eliminates this concern, thereby making these types of backflow preventers also usable in preferred systems. Other suitable backflow preventers may also be used consistent with the invention.

Backflow preventer 420 includes a threaded sleeve 422 for securing preventer 420 onto a threaded connection 412 on T-fitting 410. In addition, a retaining collar 426 and break off screw 428 are used to secure preventer 420 in a fixed position relative to T-fitting 410. Collar 426 is so designed to permit backflow preventer 420 to be unscrewed several revolutions and open several vents provided therein. This may be desirable to perform testing of the device, as well as to provide drainage and prevent freeze up of the device.

At the opposite end of backflow preventer 420, a threaded connection 424 is provided for connecting water inlet line 30 thereto.

Therefore, in operation, diverter 400 provides pressure relief through second port 403 when the dispenser control valve is not activated and the faucet is open. In addition, diverter 400 provides supplemental backflow prevention with a backflow preventer 420 which is less likely to be submerged than if it was located downstream on the spray gun.

Figure 8:
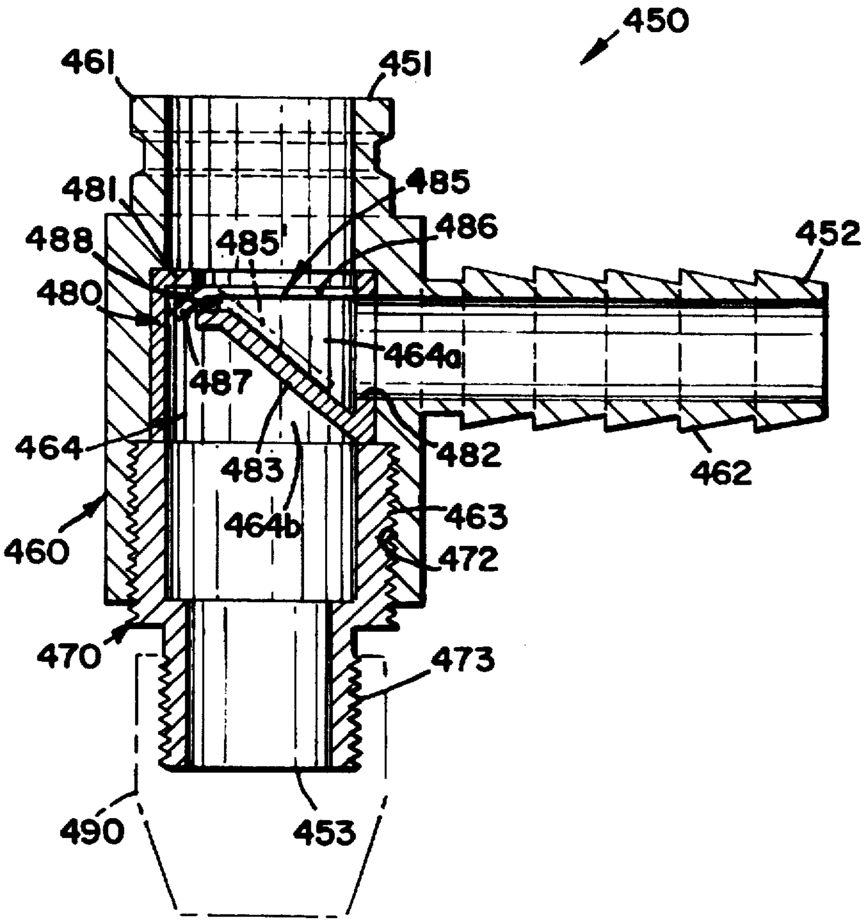
FIG. 8 is a cross-sectional view of an alternate line pressure diverter, having a fulcrumed diverter plate, and suitable for use in the apparatus of FIG. 1.

FIG. 8 shows another preferred line pressure diverter 450 which utilizes a fulcrumed diverter member, plate 485, for diverting line pressure to a second outlet 453 when a control valve downstream of the first outlet 452 is not activated. Diverter 450 includes a T-fitting or body 460 having a central chamber 464 formed therein. An inlet 451 is connected to chamber 464 through a quick connect fitting 461, and first outlet 452 is connected through a barbed fitting 462.

An insert 480 is received within chamber 464 and is secured therein by a plug 470 that is retained in fitting 460 by cooperative threads 463 and 472. Threads 473 are provided on plug 470 to permit an optional splash reducer 490 (such as an Omni type aerator) to be installed in second outlet 453.

The body of insert 480 is basically cylindrical in shape, including a ridge 481 disposed on the top thereof. A port 482 is defined in insert 480 to establish a flow path to first outlet 452, and an inclined member 483 extends across the insert to bisect chamber 464 into first and second subchambers 464*a* and 464*b*, respectively in fluid communication with first and second outlets 452 and 453.

A generally circular fulcrumed diverter member or plate 485 is pivotally connected to inclined member 483 through a pin 488 such that it is pivotable between a first position (designated by reference numeral 485) and a second position (shown in phantom and designated by reference numeral 485'). Plate 485 is bent or otherwise formed with first and second portions 486 and 487 separated by pin 488. First portion 486 has a greater surface area than portion 487 to bias the plate to favor passage of water to first outlet 452 over second outlet 453 when the control valve of the spray gun is activated.

In operation, when a control valve downstream of first outlet 452 is not activated, line pressure will urge plate 485 to assume the first position and permit passage of water through subchamber 464*b* and second outlet 453 to divert the flow of water and relieve any pressure in the system. However, when the control valve is activated, the larger surface area of portion 486 of plate 485 will urge the plate to pivot to the position shown in phantom by reference numeral 485'. In this position, portion 487 is engaged along ridge 481 to substantially block the flow of water to second outlet 453, whereby the flow of water occurs primarily through first outlet 452.

Diverter 450 offers the advantage of reduced leakage flow through second outlet 453 when flow is established through first outlet 452. The relative sizes of portions 486 and 487 may be selected to provide the necessary bias for the proper operation and leakage flow in the system.

Plate 485 is preferably a metal plate, so some minimal leakage may occur through second outlet 453. However, to further reduce the flow through second outlet 453, a gasket or other sealing material may be provided on ridge 481 and/or on portion 487 of plate 485.

Other insert designs, as well as integrally-housed designs may be used in the alternative to provide a fulcrumed member which pivots between two positions, one of which permits flow to the second outlet port when the control valve is not activated, and one of which blocks flow to the second outlet when the control valve is activated. Other modifications will be apparent to one skilled in the art.

Various additional modifications may be made to any of the above embodiments without departing from the spirit and scope of the invention. For example, the line pressure diverter may be permanently installed to a faucet, or may be installed to the faucet through a separate hose. Therefore, the invention lies in the claims hereafter appended.

What is claimed is:

1. A dispensing apparatus comprising:

(a) a chemical product dispenser for dispensing a chemical product mixed with a diluent, the chemical product dispenser including a diluent inlet line for receiving a flow of diluent from a diluent supply, and a control valve for controlling the flow of diluent to the dispenser; and (b) a line pressure diverter, interposed between the diluent inlet line of the chemical product dispenser and the diluent supply, for diverting line pressure from the diluent supply when the control valve of the chemical product dispenser is closed, wherein the line pressure diverter includes:

(1) an inlet, in fluid communication with the diluent supply;

(2) a first outlet, in fluid communication with the inlet and the diluent inlet line of the chemical product dispenser; and (3) a second outlet, in fluid communication with the inlet through a pressure relief means for diverting diluent to the second outlet when pressure downstream of the diluent supply exceeds a predetermined level, wherein the pressure relief means includes a fulcrumed diverter member pivotally connected within the line pressure diverter to pivot between first and second positions, wherein when the control valve is not activated the diverter member pivots to the first position to place the inlet in fluid communication with the second outlet, and wherein when the control valve is activated the diverter member pivots to the second position to block the flow of diluent to the second outlet.

2. The dispensing apparatus of claim 1, wherein the diverter member comprises a plate having first and second portions, oriented proximate the first and second outlets, respectively, the first portion being larger in surface area than the second portion; whereby the plate is biased to the second position due to the flow of diluent to the first outlet.

3. The dispensing apparatus of claim 1, wherein the line pressure diverter further includes a backflow preventer interposed between the first outlet and the diluent inlet line of the chemical product dispenser.

4. The dispensing apparatus of claim 3, wherein the backflow preventer is a hose connection type backflow preventer which is of the type that complies with the ASSE 1052 standard and that may be subjected to limited backpressure.

5. The dispensing apparatus of claim 1, wherein the line pressure diverter further includes splash reducing means, coupled to the second outlet port, for reducing splashing of diluent from the second outlet port.

6. The dispensing apparatus of claim 1, wherein the line pressure diverter further includes a diverter body housing the inlet and the first and second outlets and a first quick connect fitting, wherein the first quick connect fitting is mounted to the outlet of the diluent supply, and wherein the diverter body includes a second quick connect fitting for mating with the first quick connect fitting and coupling the inlet to the diluent supply; whereby the diverter body is removable from the diluent supply.

7. The dispensing apparatus of claim 1, wherein the chemical product dispenser includes a spray gun and at least one container of liquid product concentrate, wherein the spray gun includes an aspirator in fluid communication with the diluent inlet line and a product concentrate line in fluid communication with the liquid product concentrate; whereby a flow of diluent through the aperture draws liquid product concentrate into the aspirator and forms a dispensing solution therefrom.

8. The dispensing apparatus of claim 1, wherein the line pressure diverter diverts line pressure to a drain when the control valve of the chemical product dispenser is closed.

9. The dispensing apparatus of claim 1, wherein the second outlet outlets to atmospheric pressure.

10. In a dispensing apparatus of the type including a chemical product dispenser for dispensing a chemical product mixed with a diluent, the chemical product dispenser including a diluent inlet line for receiving a flow of diluent from a diluent supply having a backflow prevention device installed thereon, and a control valve for controlling the flow of diluent to the dispenser, a line pressure diverter comprising:

(a) an inlet channel in fluid communication with the diluent supply, the inlet channel being connected to the diluent supply through a quick connect fitting;

(b) a first outlet channel, in fluid communication with the inlet and the diluent inlet line of the chemical product dispenser; and (c) a second outlet channel, in fluid communication with the inlet channel through a pressure relief means for diverting diluent to the second outlet when pressure downstream of the diluent supply exceeds a predetermined level, wherein the pressure relief means includes a fulcrumed diverter member pivotally connected to pivot between first and second positions, wherein when the control valve is not activated the diverter member pivots to the first position to place the inlet channel in fluid communication with the second outlet channel, and wherein when the control valve is activated the diverter member is biased to pivot to the second position to block the flow of diluent to the second outlet channel; whereby the pressure downstream of the diluent supply is maintained at a level below that which would cause damage to the backflow prevention device installed on the diluent supply.

11. The line pressure diverter of claim 10, wherein the line pressure diverter further includes a hose connection type backflow preventer operatively connected to the first outlet channel.

12. The line pressure diverter of claim 10, wherein the chemical product dispenser is of the type including a spray gun and at least one container of liquid product concentrate, wherein the spray gun includes an aspirator in fluid communication with the diluent inlet line and a product concentrate line in fluid communication with the liquid product concentrate; whereby a flow of diluent through the aperture draws liquid product concentrate into the aspirator and forms a dispensing solution therefrom.

13. The line pressure diverter of claim 10, wherein the pressure relief means diverts line pressure to a drain when pressure downstream of the diluent supply exceeds the predetermined level.

14. The line pressure diverter of claim 10, wherein the second outlet channel outlets to atmospheric pressure.

15. The line pressure diverter of claim 10, wherein the inlet channel is connected to the diluent supply through a quick connect fitting.

16. A method of communicating diluent from a diluent supply to a diluent inlet line of a chemical product dispenser for dispensing a chemical product in solution, wherein the diluent supply is of the type having an atmospheric vacuum breaker and wherein the chemical product dispenser is of the type having a control valve for controlling the flow of diluent to the dispenser, the method comprising the steps of:

(a) when the control valve of the chemical product dispenser is open, directing diluent between the diluent supply and the diluent inlet line of the chemical product dispenser using a line pressure diverter having an inlet connected in fluid communication to the diluent supply and a first outlet connected in fluid communication to the diluent inlet line; and (b) when the control valve of the chemical product dispenser is closed, diverting diluent out of a second outlet of the line pressure diverter using a fulcrumed diverter member pivotally connected to pivot between first and second positions to maintain pressure downstream of the diluent supply at a level below that which would cause damage to the atmospheric vacuum breaker installed on the diluent supply, wherein the diverter member is biased to pivot to the second position when the control valve of the chemical product dispenser is open to block the flow of diluent to the second outlet, and wherein the diverter member pivots to the first position to place the inlet in fluid communication with the second outlet when the control valve of the chemical product dispenser is closed.

17. The method of claim 16, wherein the line pressure diverter further includes splash reducing means, coupled to the second outlet, for reducing splashing of diluent from the second outlet.

18. The method of claim 16, wherein the line pressure diverter further includes a diverter body housing the inlet and the first and second outlets and a first quick connect fitting, wherein the first quick connect fitting is mounted to the outlet of the diluent supply, and wherein the diverter body includes a second quick connect fitting for mating with the first quick connect fitting and coupling the inlet to the diluent supply; whereby the diverter body is removable from the diluent supply.

19. The method of claim 16, wherein the chemical product dispenser includes a spray gun and at least one container of liquid product concentrate, wherein the spray gun includes an aspirator in fluid communication with the diluent inlet line and a product concentrate line in fluid communication with the liquid product concentrate; whereby a flow of diluent through the aperture draws liquid product concentrate into the aspirator and forms a dispensing solution therefrom.

20. The method of claim 16, wherein the diverting step includes the step of diverting diluent to a drain when the control valve of the chemical product dispenser is closed.

21. The method of claim 16, wherein the diverting step includes the step of diverting diluent to atmospheric pressure.

* * * * *